Dec. 24, 1968  J. L. JEANNERET  3,417,478
METHOD OF AND APPARATUS FOR SIMULTANEOUSLY ADJUSTING THE
DEPTH AND LENGTH OF CUT IN A WORKPIECE ON A LATHE
Filed July 27, 1966  3 Sheets-Sheet 1

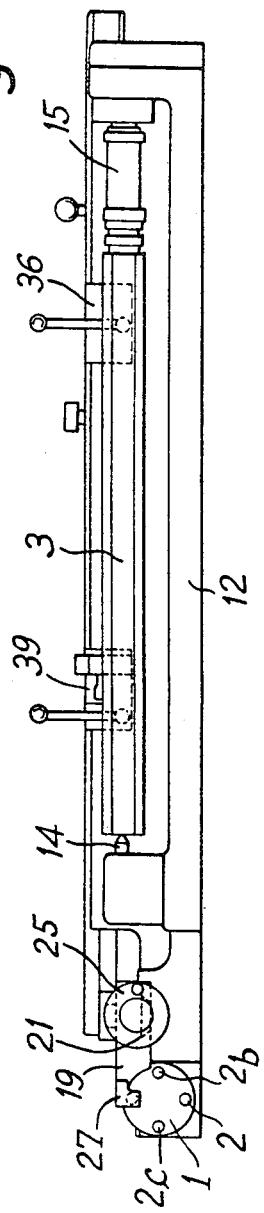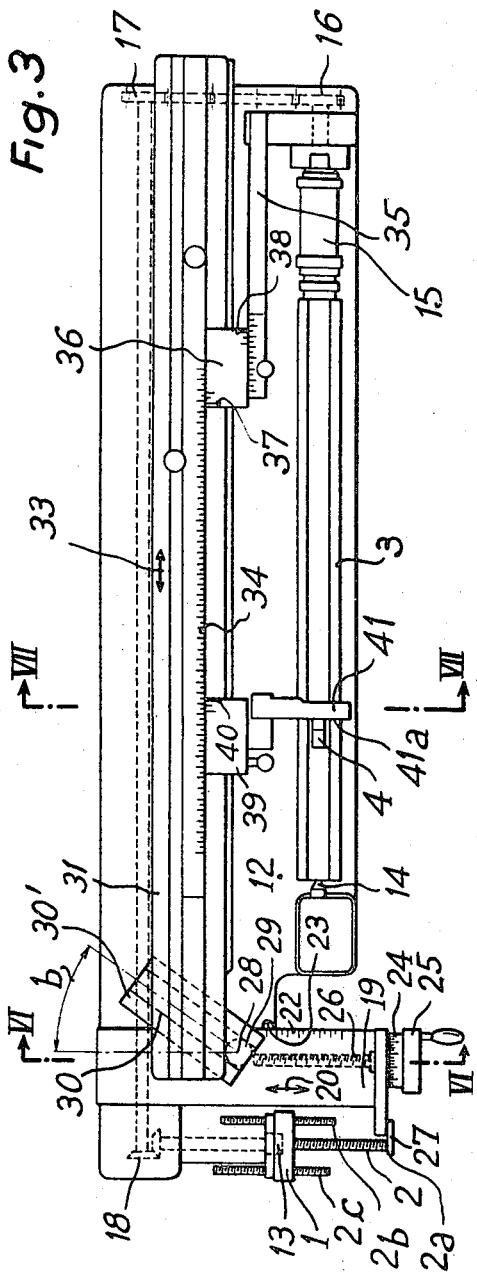

United States Patent Office 3,417,478
Patented Dec. 24, 1968

3,417,478
METHOD OF AND APPARATUS FOR SIMULTANE-
OUSLY ADJUSTING THE DEPTH AND LENGTH
OF CUT IN A WORKPIECE ON A LATHE
Jules Louis Jeanneret, 13–21 Rue Henri Gelin,
Niort, Deux-Sevres, France
Filed July 27, 1966, Ser. No. 568,230
Claims priority, application France, Aug. 25, 1965,
29,442
7 Claims. (Cl. 33—185)

ABSTRACT OF THE DISCLOSURE

Method and apparatus for simultaneously adjusting removable turrets which determine the depth and length of cut in a workpiece mounted on a lathe having a tool slide. The turrets are provided with adjustable stops. Two calibrated measuring rods are provided which are movable perpendicularly to each other and which are arranged parallel to the turrets. One of the rods is secured to the other rod in such a manner that any movement of one automatically causes movement of the other proportionally to the movement of the first rod and to the angle formed by the axis of the tool slide and the transverse axis of the workpiece.

Figure 1:
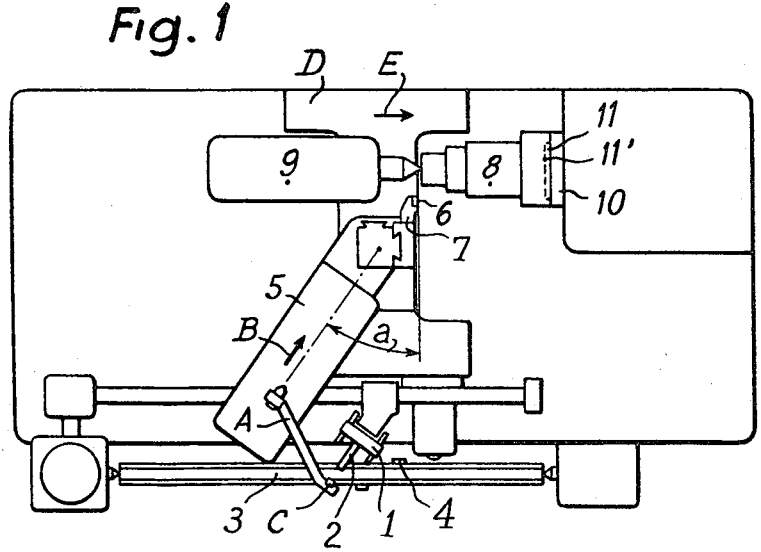

The present invention relates to a method and apparatus for simultaneously adjusting the turret determining the depth or diameter of cut and the various turrets controlling length of cut and respectively determining the transverse and longitudinal feeds of a slide on an automatic copying lathe.

Conventional automatic copying lathes are provided with a removable turret which rotates in a stepped manner and has adjustable stop members which determine the depth of successive cuts, while a second removable turret which also rotates in a stepped manner is controlled synchronously with the first turret and is provided with adjustable stops which determine the length of successive cuts.

Hitherto the copying device was pre-adjusted to the dimensions given in the working drawings of the part to be machined, by adjusting the stop members determining the depth of cut using a micrometer for the values of successive depths of cut and then separately adjusting the stops determining the lengths of cut in accordance with the successive values required, using slide calipers and taking into account the lateral shift of the tool relative to each depth of cut by reason of the inclination of the copying slide which carries the cutting tool. This adjustment process was fairly lengthy and meant that the person concerned had to measure each length of feed before adjusting the stops.

The present invention seeks to minimize or avoid the above mentioned disadvantages and has as an object to provide a method and apparatus which enables the stop members determining the length of successive cuts to be set simultaneously with those determining the depth, without it being necessary to take into account the shift of the tool which varies with the depth of each cut.

It is a further object of the invention to provide a method for simultaneously adjusting the removable "diameter" and "length of cut" turrets, said method consisting in simultaneously adjusting the stops determining length and depth of cut, on a device independent of the copying lathe and using two calibrated measuring rods which are movable on perpendicular axes and which are arranged parallel to the axis of the depth of cut turrets and of the length of cut turret respectively, one of the said rods being secured to the other in such a manner that any movement of one automatically entails movement of the other proportionally to the movement of the first rod and to the angle formed by the axis of the tool head or slide and the transverse axis of the workpiece.

It is a further object of the invention to provide adjusting apparatus for carrying out this method, said apparatus comprising a frame on which are slidably mounted two calibrated measuring rods movable on two perpendicular axes parallel to the axis of the turret determining the length of cut and to the axis of the turret determining depth of cut and serving to indicate the length and depth of cut respectively, the rod indicating the length of cut being fixed in translation with the rod indicating the depth of cut by means of a roller mounted on the latter and moving in a slideway provided in the other rod, while its axis forms a predetermined angle with the axis of the rod indicating depth of cut, the said turrets being located on the frame and being driven in rotation simultaneously and in a stepped manner.

Figure 2:
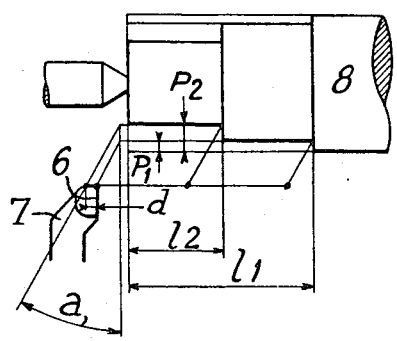
Figure 5:
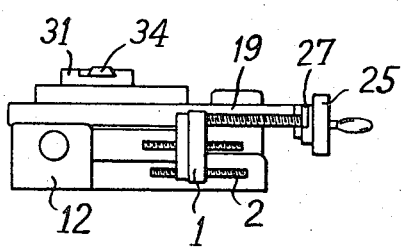
Figure 6:
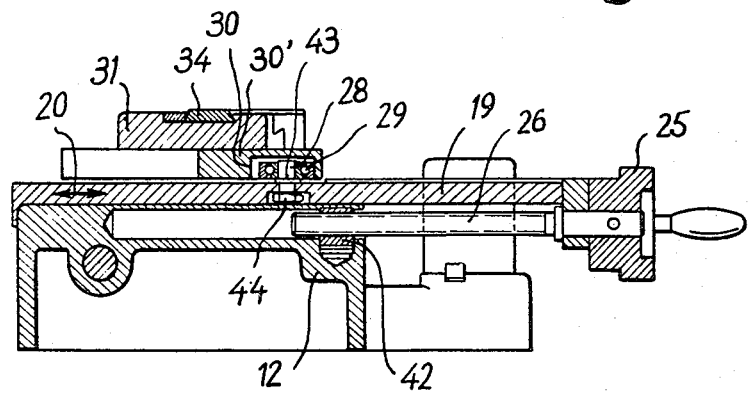
Figure 7:
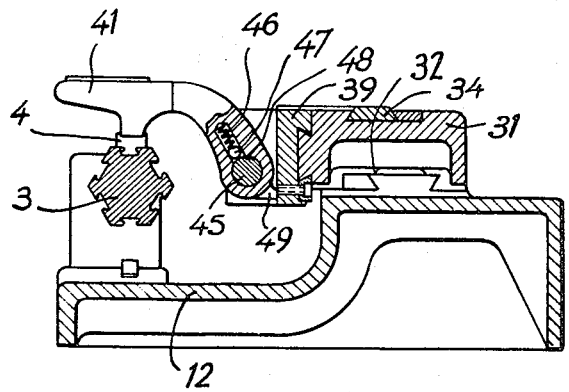

Other advantages and features of the invention will become clear from the following description of an embodiment of an adjustment device given solely by way of example with reference to the accompanying drawings, in which:

FIGURE 1 is a plan view of an automatic copying lathe having turrets determining the depth or diameters and lengths of cut, FIGURE 2 is a diagram indicating the path of the tool when cutting a workpiece, FIGURE 3 is a plan view of apparatus for adjusting the depth or diameter and length of cut turrets, FIGURE 4 is an elevational view of the apparatus shown in FIGURE 3, FIGURE 5 is a view from the left of the apparatus shown in FIGURE 4, FIGURE 6 is a sectional view along the line VI—VI in FIGURE 3, and FIGURE 7 is a sectional view along the line VII—VII in FIGURE 3.

Referring now to the drawings, FIGURE 1 shows a copying lathe provided with a removable turret 1 which determines the depths of cut by means of adjustable stops 2, and with a removable turret 3 which determines the lengths of cut by means of adjustable stop members 4.

The axis of the turret 1 is parallel to the axis of the copying slide 5 which carries the cutting tool 7 and which forms, with the cutting edge 6 of this tool 7, an angle $a$.

In FIGURE 1 the workpiece 8 is held between the movable headstock 9 and the spindle 10 which is provided with various clamping and driving means schematically illustrated at 11. Such spindles and clamps and drives therefor are so well known in the art as to require no further description.

Operation of the lathe fitted with the turrets described is substantially as follows:

The copying slide 5 has an arm A secured thereto and moves in the direction of the arrow B until the contact portion C on the arm A meets the end of the adjustable stop 2, thus defining the depth of cut desired.

In FIGURE 2, the workpiece 8 has two shoulders which represent two depths of cut $p1$ and $p2$ and two lengths of cut $l_1$ and $l_2$, the lateral shift of the tool between these two depths of cut $p1$ and $p2$ being $d$.

As may be seen in FIGURES 3, 4 and 5, the adjustment device comprises a frame 12. The turret 1 determining depth of cut is located on a hub 13 and the turret 3 determining length of cut is arranged between a point 14 and a drive 15, the hub 13 and drive unit 15 being synchronized in rotation by means of a conventional transmission system of the bevel gear type 16, 17 and 18.

A slide 19 moves in the direction of the double arrow 20 on a slideway 21 parallel to the axis of the barrel 1.

This movement of the slide 19 is controlled by means of a calibrated rod 22 indicating the depth of cut, a gauge 23 secured to the frame 12 and a vernier 24 with a hand wheel 25, which is secured in turn to a screw 26 engaging in the frame 12 (FIGURE 6).

The slide 19 is provided with a contact member 27 which abuts against the ends 2a, 2b, and 2c of the adjustable stops 2.

The slide 19 is provided at its upper part with a shaft 28 perpendicular to the slideway 21 and a roller 29 moving in a groove 30 located in a connecting piece 30' secured to a slide 31. The groove 30 is at a predetermined angle b with respect to the axis of the slide 19. The slide 31 moves in a slideway 32 (shown in FIGURE 7) in the direction of the double arrow 33, parallel to the axis of the turret 3 and at right angles to the slide 19, the slideway 32 being secured to the frame 12.

The slide 31 is provided with a calibrated rod 34 indicating the length of cut, which moves with respect to the said slide. An auxiliary calibrated rod 35 is located parallel to the rod 34 and along the two rods 34 and 35 there moves a slide 36 which is provided with two gauges 37 and 38 opposite the rod 34 and the auxiliary rod 35 respectively.

A second slide 39, which carries a gauge 40 opposite the rod 34, slides along the said rod 34.

The slide 39 is provided with a lever 41 which may be depressed transversally relative to the axis of the turret 3.

In FIGURE 6, the slide 19 is secured to the screw 26 which is engaged in the frame 12 by means of a nut 42 fixed thereon. The shaft 28 of the roller 29 is secured to the slide 19 by means of a shoulder 43 and a keeper nut 44.

As may be seen from FIGURE 7, the lever 41 is mounted so as to rotate freely on a shaft 45 of the slide 39. The lever 41 is held in raised position by means of a spring which urges a ball 47 into a seating 48 on the shaft 45 and is provided with an end position stop member 49.

The operation of the device is as follows:

As is known, when the cutting tool moves (FIGURE 2) from the position corresponding to depth of cut $p1$ to the position corresponding to depth of cut $p2$, it shifts by a value $d$ proportionately to the difference between the depths of cut $p1$ and $p2$ and to the angle $a$ as expressed by the equation $d=(p2-p1)\tan a$.

Hitherto, it has been necessary to take this shift into account when adjusting the position of the stops 4 on the turret 3 for the depths of cut required, using slide calipers.

The slide 19 is first adjusted so that the gauge 23 is located opposite 0 on the measuring rod 22. The slide 36 is then moved so that the gauge 38, indicates, on the auxiliary rod 35, the distance between the end of the workpiece 8 adjacent the spindle 10 and the butting face 11' of the various clamping or driving means 11 for the workpiece, 8.

The rod 34 is then moved with respect to the slide 36 so that the gauge 37 indicates on this rod the total length of the workpiece 8.

In order simultaneously to adjust the turrets 1 and 3, the said turrets are removed from the lathe and the turret 1 for depth of cut is located on the hub 13 while the turret 3 for length of cut is placed between the point 14 and the drive 15.

The depth of cut is shown by means of the calibrated measuring rod 22 and the vernier 24, the scales of which are not in millimetres but are corrected so that the unit of length is equal to 1 mm./cos $a$.

In fact, on the lathe shown in FIGURE 1, the axis of the turret 1 is parallel to the axis of the slide 5 and forms the angle $a$ with the edge 6 of the cutting tool 7. Thus in order to obtain a depth of cut of 1 mm., the slide moves along a distance equal to 1 mm./cos $a$.

When the corrected depth of cut is indicated opposite the gauge 23, the stop member 2 is adjusted so that its end 2a is brought into contact with the member 27.

The movement of the slide 19 corresponding to the corrected depth of cut indicated, causes a lateral displacement of the connecting piece 30' with respect to the roller 29 sliding in the groove 30. This movement of the connecting piece 30' causes a lateral movement towards the turret 1 by the calibrated rod 34 secured to the slide 31.

This lateral movement of the rod 34 is proportional to the corrected depth of cut indicated and to the tangent of the angle $b$ formed by the axis of the groove 30 and the axis of the slide 19.

On the lathe (FIGURE 1), the distance traversed by the slide 5 and corresponding to the depth of cut $pl$ is equal to $pl/\cos a$. This movement of the slide 5 for a distance equal to $pl/\cos a$ results in a lateral shift of the tool 7 equal to:

$$d=pl\tan a$$

Thus, when effecting a movement of the slide 19 equal to $pl/\cos a$, a lateral displacement of the rod 34 is obtained which is equal to $pl \tan a$, on condition that the equation $pl/\cos a \times \tan b = pl \tan a$ (i.e. $\tan b = \sin a$) is satisfied.

It is therefore merely necessary to give the angle $b$ a value such that the tangent of that angle is equal to the sine of the angle $a$, for the correction brought about by the lateral shift of the tool 7 to be effected automatically by the lateral displacement of the rod 34.

The slide 39 is then moved so that the gauge 40 indicates on the rod 34 the length of cut corresponding to the depth of cut required. The lever 41 is then depressed (FIGURE 7) and the stop member 4 is brought into abutment against the face 41a of the lever 41 and locked in the T-shaped groove in the turret 3.

The drive unit 15 causes the turrets 1 and 3 to revolve one notch so that the end 2b of a second stop member is located opposite the contact member 27 and a second T-shaped groove in the turret 3 moves into working position.

When the second corrected depth of cut is shown on the gauge 23, the end 2b of the second stop member is brought into abutment with the contact member 27.

The gauge 40 on the slide 39 is then moved so as to show on the calibrated rod 34 the second corresponding length of cut. The lever 41 is depressed once more and the stop member 4' is positioned as before at the desired point on the turret 3.

Turrets 1 and 3 are thus adjusted simultaneously for each movement of the slide. The turrets thus adjusted are then mounted at the locations provided for them on the automatic copying lathe.

It is, of course, possible to use this device for independently adjusting either the diameter turret 1 or the length turret 3.

Similarly, this device may also be used for adjusting turrets similar to the turret 3 but controlling other control elements in an automatic cycle, such as a variable gear, variable tool feed, auxiliary slide, etc.

The invention is, therefore, not limited to the embodiment herein described but extends to all modifications thereof within the scope of the appended claims.

I claim:

1. A method for simultaneously adjusting removable turrets respectively controlling depth and length of cut in a workpiece mounted on a lathe having a tool slide, said turrets being provided with adjustable stops, said method comprising simultaneous adjusting said stops determining length and depth of cut, on a device which is independent of the lathe and using two calibrated measuring rods which are movable on perpendicular axes and which are arranged parallel to the axes of the turret controlling depth of cut and of the turret controlling length of cut respectively, and connecting said rods together such that any movement of one automatically entails movement of the other in proportion to the magnitude of movement of the first rod and the angle formed by the axis of the tool slide and the transverse axis of the workpiece.

2. Apparatus for adjusting removable turrets respectively controlling depth and length of cut in a workpiece mounted on a lathe provided with a slide tool, said adjusting apparatus comprising a frame, two calibrated measuring rods, and means mounting said rods on said frame such that said measuring rods are movable along respective perpendicular axes arranged parallel to the turret controlling the depth of cut and the turret controlling the length of cut respectively, the rod parallel to the turret for the depth of cut constituting a depth of cut gauge and the rod parallel to the turret controlling the length of cut constituting the length of cut gauge, and means coupling said rods together for enforced common movement.

3. Apparatus as set forth in claim 2 wherein said means coupling said rods is constructed such that said length of cut gauge is fixed in translation relative to said depth of cut gauge, whereby any movement of the latter corresponding to a given depth of cut automatically produces a movement of the former equal to the lateral shift of said cutting tool when it is moved in order to effect this depth of cut.

4. Apparatus as set forth in claim 3 wherein said means coupling said gauges comprises a roller secured to said depth of cut gauge, a slide slidably receiving said roller and integral with the other calibrated measuring rod, said slide being oriented on an axis which forms a predetermined angle with the axis of the depth of cut gauge, the tangent of said predetermined angle being equal to the sine of the angle formed by the axis of the tool slide and the transverse axis of the workpiece.

5. Apparatus as set forth in claim 4 comprising a slide for said depth of cut gauge, a contact member on the latter said slide which defines for each depth recorded on said gauge, the position of the adjustable stop members of the depth of cut turret.

6. Apparatus as set forth in claim 5 comprising a slide for said length of cut gauge which indicates the length of cut and a lever secured to the last mentioned slide which is depressible to define the position of said stop members on said length of cut turret.

7. Apparatus as set forth in claim 2 comprising rotating means mounting said length and depth of cut turrets on said frame for simultaneously rotating said turrets in a stepped manner.

References Cited

UNITED STATES PATENTS 2,648,237   8/1953   Falconi _____ 82—34
3,215,011   11/1965   Findeis _____ 82—14

FOREIGN PATENTS 424,421   5/1967   Switzerland.

GERALD A. DOST, *Primary Examiner.*

U.S. Cl. X.R.

82—34; 90—56; 33—181